United States Patent [19]
Chapman

[11] 4,064,488
[45] Dec. 20, 1977

[54] SAMPLED SIGNAL DETECTOR

[75] Inventor: Ronald Howard Chapman, Wheaton, Ill.

[73] Assignee: Motorola, Inc., Schaumburg, Ill.

[21] Appl. No.: 694,744

[22] Filed: June 10, 1976

[51] Int. Cl.² .................... H04Q 9/08; G06F 11/00
[52] U.S. Cl. ........................... 340/171 R; 328/136; 340/146.1 BA; 340/146.2; 340/147 SY; 340/168 B; 364/514
[58] Field of Search ...... 340/171 R, 147 SY, 146.1 R, 340/146.1 BA, 146.2, 171, 168 B; 179/84 VF; 328/151, 136, 138; 235/181

[56] References Cited

U.S. PATENT DOCUMENTS

| | | | |
|---|---|---|---|
| 3,953,674 | 4/1976 | Fletcher | 340/147 SY |
| 3,973,242 | 8/1976 | Field et al. | 340/146.1 BA |
| 3,983,379 | 9/1976 | Scott | 235/181 X |

*Primary Examiner*—Donald J. Yusko
*Attorney, Agent, or Firm*—Sang Ki Lee; James W. Gillman

[57] ABSTRACT

A few cycles of an input signal are correlated, or compared, with a few cycles of the input signal received at a previous interval and the interval is varied when correlation, or a positive comparison, has been obtained with the apparatus providing an output or detection signal after a predetermined number of correlations have occurred.

18 Claims, 2 Drawing Figures

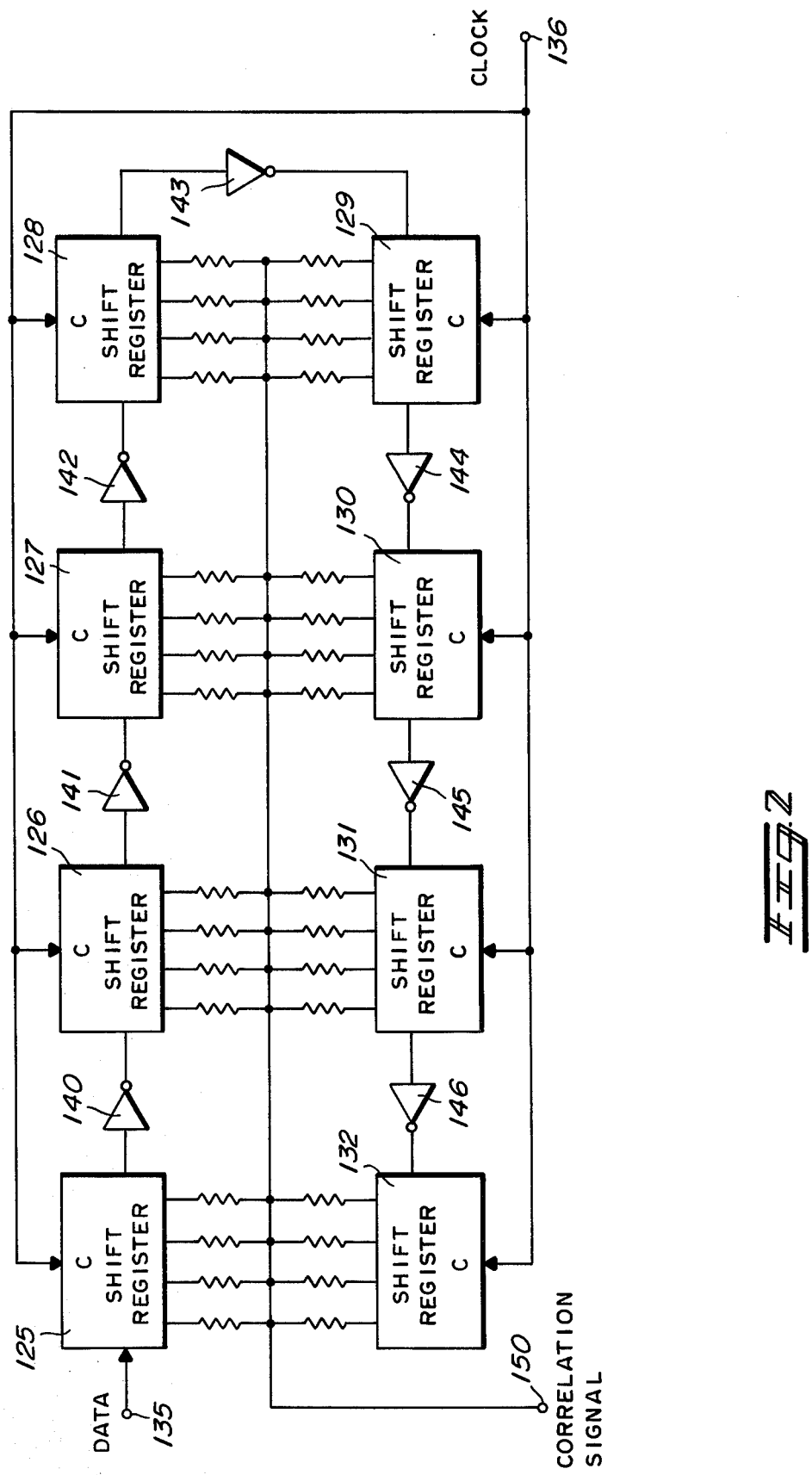

SAMPLED SIGNAL DETECTOR

BACKGROUND OF THE INVENTION

1. Field of the Invention

In many types of apparatus, such as two way radios, pagers, etc., specific signals are utilized to establish a communications link between two remote pieces of equipment. One common type of specific signal utilized includes one or more low frequency tones. It is, therefore, a necessity to include circuitry in these pieces of apparatus which will recognize specific signals or tones and provide an output signal when the correct signals or tones are received. This output signal is then used to activate audio or visual indicators, turn on receivers, etc.

Further, in some instances it is desirable to send the tones or specific signals along with audio or data signals. To do this a portion of the audio or data is notched out and the tones or specific signals are multiplexed into the notch. In these instances it is imperative that the notch remove a very small amount of the audio or data, but still include enough tone or specific signal to be detected.

2. Description of the Prior Art

In prior art devices, circuitry capable of recognizing specific signals or tones includes mechanical vibrating devices (reeds or crystals) or electrical filters which allow only the desired signals or tones to pass. These prior art devices are effective but the signal or tone must be present for a relatively long period of time before recognition or detection can occur. Further, the signal or tone must be monitored continuously by the prior art devices for the relatively long period of time.

SUMMARY OF THE INVENTION

The present invention pertains to apparatus for correlating a few cycles of input signals with a few cycles of the input signal received at a previous interval, varying the interval when correlation occurs and providing a detection signal after a predetermined number of successive correlations. A number of successive correlations are required to distinguish between frequencies other than the desired frequency and to compensate for any noise or other interference that may have caused a single correlation.

It is an object of the present invention to provide a new and improved sampled signal detector for detecting a periodically recurring signal.

It is a further object of the present invention to provide a sampled detector which is capable of detecting periodically recurrng signals in a reletevely short period of time and without the necessity of monitoring the signal continuously.

These and other objects of this invention will become apparent to those skilled in the art upon consideration of the accompanying specification, claims and drawings.

BRIEF DESCRIPTION OF THE DRAWINGS

Referring to the drawings,

FIG. 2 is a block/schematic diagram of a portion of another embodiment of a sampled signal detector.

DESCRIPTION OF THE PREFERRED EMBODIMENTS

Figure 1:
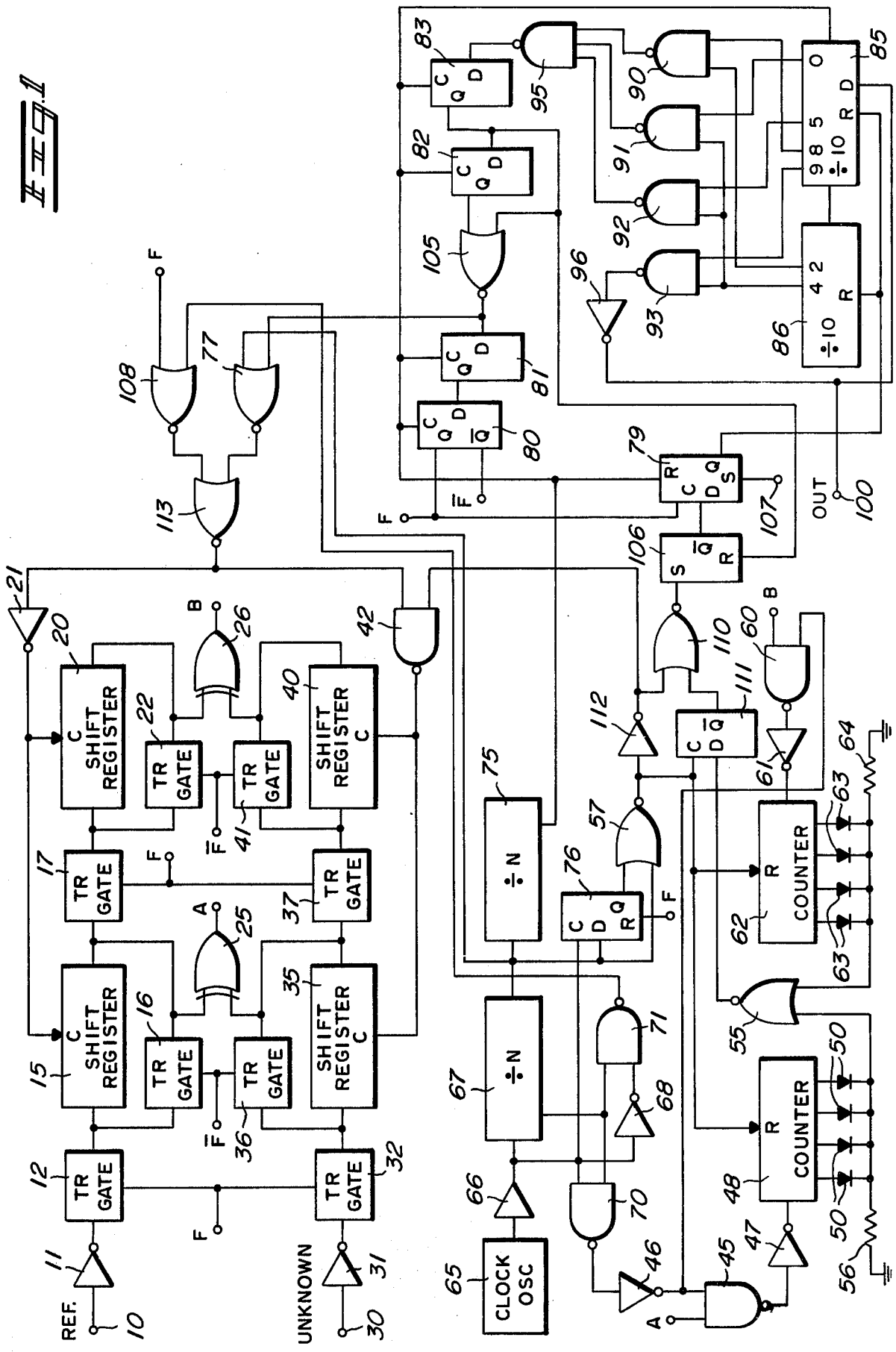
FIG. 1 is a block diagram of a sampled signal detector embodying the present invention.

Referring to FIG. 1, a first input terminal 10, adapted to receive a reference signal, is connected through an inverter 11 to an input of a transmission gate 12. The transmission gate 12 has a second input for receiving a gating signal, which input is labeled F to indicate that it is connected to an output signal to be described presently. The output of the transmission gate 12 is connected to an input of a shift register of 64 stages 15, the output of which is connected to the input of a transmission gate 16 and a transmission gate 17. The shift register 15 has a second input for receiving clock pulses thereon, which is designated C in accordance with the common practice in this art. The transmission gate 16 has a second input for receiving gating signals thereon, which is designated $\overline{F}$, the further connection of which will be described presently, and an output that is connected to the input of the shift register 15. The transmission gate 17 has a second input for receiving gating impulses thereon which is designated F and an output which is connected to the input of a shift register of 64 stages 20. The shift register 20 has a second input for receiving clock pulses thereon, designated C which is connected to the clock pulse input of the shift register 15 and to the output of an inverter 21. The output of the shift register 20 is connected to the input thereof through a transmission gate 22, which has an input, labeled $\overline{F}$, for receiving gating pulses thereon. The output of the shift register 15 is also connected to one input of an exclusive OR gate 25 and the output of the shift register 20 is connected to one input of a second exclusive OR gate 26. The outputs of the exclusive OR gates 25 and 26 are labeled A and B, respectively, and will be described in more detail presently.

A second signal input, designated 30, is adapted to receive an unknown signal thereon which is a periodically recurring signal to be analyzed. The signal on the input 30 is applied through an inverter 31 to a transmission gate 32. The transmission gate 32 has a second input for receiving gating signals thereon, which is designated F. The output of the transmission gate 32 is applied to an input of a shift register of 64 stages 35. A second input of the shift register 35, designated C, is adapted to receive clock pulses thereon. The output of the shift register 35 is coupled to the input thereof through a transmission gate 36 and is also connected to a transmission gate 37. The transmission gates 36 and 37 each have second inputs for receiving gating signals thereon which are labeled $\overline{F}$ and F, respectively. The output of the transmission gate 37 is connected to an input of a shift register of 64 stages 40, the output of which is coupled to the input thereof through a transmission gate 41. The transmission gate 41 has another input labeled $\overline{F}$ for receiving gating pulses thereon. The shift register 40 has a second input labeled C, for receiving clock pulses thereon, which is connected to the C input of the shift register 35 and to the output of a NAND gate 42. The output of the shift register 35 is connected to a second input of the exclusive OR gate 25 and the output of the shift register 40 is connected to a second input of the exclusive OR gate 26. The shift registers 15, 20, 35 and 40 and the above described circuitry associated therewith are utilized as signal storage means, the operation of which will be described presently.

The output of the exclusive OR gate 25, labeled A, is applied to a similarly labeled input of a NAND gate 45. A second input of the NAND gate 45 is connected to the output of an inverter 46. The output of the NAND gate 45 is connected through an inverter 47 to an input of a counter 48. A plurality of outputs of the counter 48 are connected through a plurality of diodes 50 to an input of a NOR gate 55. The input of the NOR gate 55 is also connected to a resistor 56 to ground. The specific outputs of the counter 48 connected through the diodes 50 to the input of the NOR gate 55 are chosen so that the number of pulses applied to the input thereof must exceed a predetermined count before the circuit will provide an output signal at the NOR gate 55. A reset input, labeled R, of the counter 48 is connected to an output of a NOR gate 57. The output, labeled B, of the exclusive OR gate 26 is connected to one input of a NAND gate 60. A second input of the NAND gate 60 is connected to the output of the inverter 46. The output of the NAND gate 60 is connected through an inverter 61 to an input of a counter 62. A reset input, labeled R, of the counter 62 is connected to the output of the NOR gate 57. A plurality of outputs of the counter 62 are connected through a plurality of diodes 63 to a second input of the NOR gate 55. The second input of the NOR gate 55 is also connected through a resistor 64 to ground. The particular outputs of the counter 62 connected to the NOR gate 55 through the diodes 63 are chosen so that at least a predetermined count in the counter 62 supplies a signal to the second input of the NOR gate 55. The exclusive OR gates 25 and 26 and the counters 48 and 62 with their associated circuitry comprise correlation means, the operation of which will be described in detail presently.

Timing means for controlling the operation of the signal storage means and the correlation means are constructed, in this embodiment, as follows. A clock or basic oscillator 65 is connected through an amplifier 66 to the input of a divide by N divider 67, an inverter 68 and one input of a NAND gate 70. A divide by 2 output of the divider 67 is connected to a second input of the NAND gate 70 and to one input of a NAND gate 71. The output of the NAND gate 70 is connected to the input of the inverter 46, and the output of the inverter 68 is connected to a second input of the NAND gate 71. This circuit provides two clock signals which are one-half the frequency of the clock signals produced by the clock 65 and which are 180° out of phase with each other. The output of the divider 67, the frequency of which is 128th of the frequency at the input, is connected to the input of a second divide by N divider 75, the D input of a D-type flip-flop 76, one input of the NOR gate 57 and one input of a NOR gate 77. A clock input, labeled C, of the flip-flop 76 is connected to the output of the amplifier 66 and a reset input, labeled R, is connected to the source of signals labeled F, to be explained presently. The output of the flip-flop 76 is connected to a second input of the NOR gate 57. A divide by 32 output of the divider 75 is connected to a reset input, labeled R, of a D type flip-flop 79, the clock inputs, labeled C, of four D type flip-flops 80, 81, 82 and 83 and the signal input of a divide by 10 divider 85. The divide by 10 output of the divider 85 is connected to the signal input of a second divide by 10 counter 86.

The divider 85 has 10 output taps representative of units measurements of time and the divider 86 has 10 output taps representative of tens measurements of time in the production of a predetermined interval of time. Four NAND gates 90, 91, 92 and 93 each have two inputs connected to the two counters 85 and 86 so that each is representative of a predetermined time interval. For example, the two inputs of the NAND gate 90 are connected to the divide by 8 tap of the divider 85 and the divide by 2 tap of the divider 86 so that the output of the NAND gate 90 is an interval of 280 milliseconds, with a clock input to the counter 85 of 100 Hz. Further, the two inputs of the NAND gate 91 are connected to the divide by 0 tap of the divider 85 and the divide by 4 tap of the divider 86 to provide a 400 millisecond interval (a 120 millisecond interval after the end of the first interval), the two inputs of the NAND gate 92 are connected to the divide by 5 tap of the divider 85 and the divide by 4 tap of the divider 86 to provide a 450 millisecond interval (a 50 millisecond interval after the end of the second interval), and the two inputs of the NAND gate 93 are connected to the divide by 9 tap of the divider 85 and the divide by 4 tap of the divider 86 to provide a 490 millisecond interval (a 40 millisecond interval after the end of the third interval).

The outputs of the NAND gates 90, 91 and 92 are connected to 3 inputs of a NAND gate 95, the output of which is connected to the D input of the flip-flop 83. The output of the NAND gate 93 is connected through an inverter 96 to an output terminal for the detector, labeled 100, and to a disable input labeled D, of the counter 85. Since each of the flip-flops 80, 81, 82 and 83 are clocked at the same rate as the frequency of the input signal to the dividers 85 and 86, each of the flip-flops represents one unit of time, or 10 milliseconds if the frequency of the clock signal is 100 Hz. The output of the flip-flop 83 is connected to the D input of the flip-flop 82, one input of a NOR gate 105 and the reset input, labeled R, of a set-reset type flip-flop 106. The output of the flip-flop 82 is connected to a second input of the NOR gate 105 and the output thereof is connected to the D input of the flip-flop 81 and to a second input of the NOR gate 77. The output of the flip-flop 81 is connected to the D input of the flip-flop 80. The Q output of the flip-flop 80 is the source of signals labeled F in the previous description and the $\bar{Q}$ output is the source of signals labeled $\bar{F}$ in the previous descriptions. In addition to the connections previously described, the F signal from the flip-flop 80 is connected to the clock input, labeled C, of the flip-flop 79 and one input of a NOR gate 108. The flip-flop 79 has a set input, labeled S, with an input terminal 107 connected thereto for purposes of restarting the detector once an output signal has been produced, as will be described presently. The output of the flip-flop 79 is connected to the reset inputs of the dividers 85 and 86. The D input of the flip-flop 79 is connected to the $\bar{Q}$ output of the flip-flop 106. The set input, labeled S, of the flip-flop 106 is connected to the output of a NOR gate 110 one input of which is connected to the $\bar{Q}$ output of a D type flip-flop 111 and the other input of which is connected through an inverter 112 to the output of the NOR gate 57. The output of the inverter 112 is also connected to one input of the NAND gate 42 in the storage means. The output of the correlation means, which is present at the output of the NOR gate 55, is applied to the D input of the flip-flop 111. The output of the NOR gate 57, which is applied to the reset inputs, labeled R, of the counters 48 and 62 is also applied to the clock input labeled C, of the flip-flop 111. The output of the NAND gate 71 is applied to a second input of the NOR gate 108 and the outputs of the NOR gates 77 and 108 are applied to two inputs of a NOR gate 113. The output of the NOR gate 113 is connected to the input of the inverter 21 and a second input of the NAND gate 42 in the storage means.

Operation

For purposes of describing the operation of the above-described circuit, it will be assumed that the frequency of the clock 65 is 409,601 Hz., the frequency of the signals at the outputs of the NAND gate 70 and 71 is 204,800 Hz., the frequency at the output of the first divider 67 is 3200 Hz., and the frequency at the output of the divider 75 is 100 Hz. It will of course be understood by those skilled in the art that many other frequencies and dividing or multipling schemes might be utilized and the present circuitry and frequencies are simply for purposes of explanation. Assuming that the apparatus has just been turned on or the dividers 85 and 86 have just been reset, nothing occurs until 280 milliseconds have gone by. At 280 milliseconds the output of the NAND gate 95 generates a pulse. This pulse is delayed 10 milliseconds by flip-flop 83 and is stretched into a 20 millisecond pulse by flip-flop 82 and NOR gate 105. The 20 millisecond low pulse that appears at the output of NOR gate 105 allows 64 clock pulses of the 3200 Hz signal to pass through the NOR gate 77. The output of the NOR gate 108 is low because the F signal is high. Because the NOR gate 113 has a low signal on one input and the 3200 Hz. signal on the other input, the 3200 Hz signal will be passed through the NOR gate 113, through the inverter 21 to the clock inputs of the shift registers 15 and 20. Simultaneously, the high F signal is being applied to the reset input of the flip-flop 76, which produces a high output that is applied to the NOR gate 57. With a high input to the NOR gate 57, the output is low and after being inverted by the inverter 112 appears as a logical high at the input of the NAND gate 42. Thus, the 3200 Hz. signal passes through the NAND gate 42 and is applied to the clock inputs of the shift registers 35 and 40. Since the 3200 Hz. signal is applied for 20 milliseconds, 64 pulses are applied to the clock inputs of the shift registers 15, 20, 35 and 40. Also, since the F signal is high the transmission gates 12, 17, 32 and 37 are activated to pass information therethrough while the low $\overline{F}$ signal maintains the transmission gates 16, 22, 36 and 41 inactivated. Thus, 64 sampled bits of the reference signal are clocked into the shift register 15 and 64 sampled bits of the unknown are clocked into the shift register 35.

After the delay introduced by the two flip-flops 80 and 81, 20 milliseconds in this example, the two outputs of the flip-flop 80 change in accordance with the signal applied to the D input of the flip-flop 81, i.e. the $\overline{F}$ signal goes high while the F signal goes low. With a high signal at the output of the NOR gate 105 and a low F signal applied to the input of the NOR gate 108, the 204,800 Hz. signal applied to the other input of the NOR gate 108 passes therethrough. Thus, during the 20 milliseconds that F is low 64 × 64 pulses of the 204,800 Hz. signal pass through the NOR gate 113 and are applied through the inverter 21 and NAND gate 42 to the clock inputs of the shift registers 15, 20, 35 and 40. Also, since the F signal is low the transmission gates 12, 17, 32 and 37 are deactivated while the high $\overline{F}$ signal activates the transmission gates 16, 22, 36 and 41. Thus, the sample bits in the shift registers 15, 20, 35 and 40 are circulated within the registers at a relatively high rate. As the sample bits are circulated, the sample bits in the shift register 15 are compared to the sample bits in the shift register 35 by means of the exclusive OR gate 25 and all errors, or non-correlations, appear as pulses which are counted by the counter 48. The sample bits in the shift register 20 are compared to the sample bits in the shift register 40 by means of the exclusive OR gate 26 and all errors, or non-correlations, appear as pulses which are counted by the counter 62. When the count in the counter 48 and/or the counter 62 reaches at least a predetermined value, determined by the connection of the diodes 50 and 63, respectively, (counts 8, 16, 32 or 64 in this embodiment) a high signal is applied to one or both of the inputs of the NOR gate 55. This appears as a low signal at the output thereof and is applied to the flip-flop 111 which in turn produces a high signal at the $\overline{Q}$ output thereof when a clock pulse is applied to the C input. By allowing up to eight errors before the counters 48 or 62 produce an output pulse, the present detector has a relatively wide bandwidth and unknwon signals which have a frequency close to that of the reference signal may be detected. To increase the bandwidth the errors required to produce an output from the counters 48 or 62 is increased and vice versa. If substantially no, or very narrow, bandwidth is desired the counters 48 and 62 could be removed and a simple memory circuit substituted therefore which would provide the proper timing for operation of the circuit.

The combination of the flip-flop 76 and the NOR gate 57 provide a single narrow positive pulse at the output of the NOR gate 57 for each cycle of the 3200 Hz signal, which appears as an additional pulse at the 204,800 Hz. frequency. The single positive pulse at the output of the NOR gate 57 appears after the sample bits in the shift registers 15, 20, 35 and 40 have been shifted through each entire cycle (64 clock pulses applied to the clock inputs of the shift registers). This additional pulse resets the counters 48 and 62, clocks the flip flops 111 and, after being inverted by the inverter 112, is applied through the NAND gate 42 to the shift registers 35 and 40 to shift the sample bits therein one additional position. Thus, by circulating the information in the shift registers 15, 20, 35 and 40 a number of times equal to the number of bits stored in each register, 64 in this embodiment, during each predetermined time interval all of the sample bits in the registers 15 and 20 are compared to all of the sample bits in the registers 35 and 40, respectively.

Each time the sample bits in the shift registers 15, 20, 35 and 40 are circulated, the sample bits in the shift registers 15 and 35 and the sample bits in the shift registers 20 and 40 are compared, respectively, and the errors therebetween are counted by the counters 48 and 62, respectively. In each of the 64 comparisons or circulations in which the count in either of the counters 48 or 62 exceeds a predetermined value, a high signal is applied to one or both of the inputs of the NOR gate 55 and a low appears at the output thereof. However, if the count in both of the counters 48 or 62 does not exceed the predetermined value in any one of the 64 comparisons or circulations, a low signal is applied to both of the inputs of the NOR gate 55 and a high appears at the output thereof. The signal at the output of the NOR gate 55 is applied to the D input of the flip-flop 111 and is clocked through the flip-flop 111 by the additional pulse from the NOR gate 57 at the end of each of the circulations. A low at the input of the flip-flop 111 appears as a high at the $\overline{Q}$ output, which supplies a low through the NOR gate 110 to the set input of the flip-flop 106. A high at the input of the flip-flop 111 appears as a low at the $\overline{Q}$ output, which supplies a high through the NOR gate 110 at the set input of the flip-flop 106. Once a high set pulse is applied to the flip-flop 106 a low output is available at the $\overline{Q}$ output and this output will not change until a new reset pulse is applied to the flip-flop 106. However, if no high is applied to the set input of the flip-flop 106, the $\overline{Q}$ output will remain high. The high or low pulse at the output of the flip-flop 106 is applied to the D input of the flip-flop 79 but is not clocked therethrough until the beginning of the next F pulse, which occurs at some time after all of the information has been circulated 64 times in the shift registers. In the present embodiment the beginning of the F pulse occurs 320 milliseconds after the counters 85 and 86 have been started or reset (a 280 millisecond interval produced by NAND gate 90 and 10 millisecond delays in each of the flip-flops 80, 81, 82 and 83). When the flip-flop 79 is clocked, if a high is present at the D input, a high appears at the output and is applied to reset the dividers 85 and 86. Because the dividers 85 and 86 are reset the next F pulse will appear 320 milliseconds later. However, if a low is present at the D input of the flip-flop 79 when it is clocked, the output thereof is low and the dividers 85 and 86 are not reset so that the next F pulse or time interval is only 140 milliseconds long.

In the above description of the operation, the shift registers 15 and 35 have sample bits of information clocked therein, but the shift registers 20 and 40 only have noise stored therein so that correlation between the sample bits in the shift registers 20 and 40 will not occur and the counters 85 and 86 will be reset. Thus, after the first predetermined interval of time, which in this embodiment is 320 milliseconds, the F signal will again go high and the $\overline{F}$ signal will go low so that 3200 Hz. clock pulses are again applied to the shift registers 15, 20, 35 and 40 with the transmission gates 12, 17, 32 and 37 activated to clock the sample bits in the shift registers 15 and 35 into the shift registers 20 and 40. Simultaneously, new sample bits of the input signals will be clocked into the shift registers 15 and 35. Now 64 sample bits of the unknown signal are stored in the shift register 40 and 64 sample bits of the unknown signal, taken a predetermined interval later (320 milliseconds), are stored in the shift register 35.

Correlations which occurred between the sample bits stored in the shift registers 15 and 35 will now appear, at the same time (during the same circulation of sample bits), as correlations between the sample bits stored in the shift registers 20 and 40. If the frequency of the reference signal and the unknown signal are equal, or approximatley equal, a correlation will again appear, at approximately the same time (during the same circulation), between the sample bits stored in the shift registers 15 and 35. This is true, assuming that the phases of the unknown signal and the reference signal, relative to each other, have not changed. By comparing the specific circulation in the shift registers 15 and 35 in which correlation occurred with the same specific circulation in the shift registers 20 and 40, the comparing means is essentially correlating a portion of the unknown signal with a portion of the unknown signal received at a previous interval. When correlations occur in the shift registers 15 and 35, and in the shift registers 20 and 40, simultaneously, the counters 85 and 86 are not reset, as previously described, and new information is clocked into the shift registers 15 and 35 after a shorter interval of time. If the frequency of the reference signal and the unknown signal are the same, simultaneous correlations will again occur between the shift registers, the counters 85 and 86 will again not be reset and new information will be clocked into the shift registers 15 and 35 after an even shorter interval of time. If the frequency of the reference signal and the unknown signal are identical another simultaneous correlation will occur between the sample bits stored in the shift registers 15 and 35 and in the shift registers 20 and 40 and, this time, the count in the dividers 85 and 86 will have progressed to the point that two highs will be applied to the input of the NAND gate 93, producing a low at the output thereof which will be inverted and appear as a detect signal at the output 100. This high signal will also disable the divider 85 so that no additional pulses will be accepted therein. Thus, the entire circuitry wil cease operation. If a second tone or signal is to be detected, a new reference signal is applied to the input terminal 10 and a set pulse is applied to the input terminal 107 to set the flip-flop 79, reset the dividers 85 and 86, and start the entire cycle again.

It is necessary to check for a number of successive correlations because there are a number of frequencies which can cause correlations and, thus, appear to be the desired frequency. A waveform which consists of several widely separated short bursts of a periodically recurring signal, such as a tone, can be represented by a Fourier Series. The spectral lines are spaced around $f_c$ at frequencies N/T cycles and the envelope of the amplitudes of the spectral lines is a sin X/X function with the first zero at $1/t$ away from $f_c$, where T is the spacing between bursts, $t$ is the length of the bursts and $f_c$ is the desired frequency. By storing a portion of an unknown signal during a first period $t_1$ and a second portion of the unknown signal during a second period $t_2$, the total signal can be correlated against a reference signal, as described above. If the frequency of the stored signal is the same as, or close to, the reference signal and the time T is an integer number of cycles, the signal stored during the period $t_1$ will be in phase with the signal stored during the period $t_2$. The signal stored during the period $t_1$ will again be in phase with the signal stored during the period $t_2$ when the frequency of the stored signal stored during the period $t_2$ when the frequency of the stored signal is 1/T cycles away from the reference signal. This in phase relationship will repeat every N/T cycles away from the reference signal and the correlation of the unknown signal to the reference signal will follow the sin X/X envelope of the Fourier Series. By checking a number of successive correlations with different intervals, T, therebetween the spectral lines change and only the reference signal spectral line will provide repetitive correlation.

Referring specifically to FIG. 2, a portion of a second embodiment of the present invention is illustrated including modified signal storage means and correlation means. In FIG. 2, eight clocked shift registers 125–132 form the signal storage means. The unknown signal is applied at an input terminal 135, which is the signal input to the first shift register 125 and sample bits are clocked into the shift register 125 by clock pulses applied to a clock input 136. Each of the shift registers 125–132 are clocked by the same clock pulses from the source, not shown, applied to the input 136. Also, each of the shift registers 125–132 are four-stage shift registers with an output from each stage and a final output for information that is clocked completely through the register. The final outputs of each of the stages 125–131 are connected to the signal inputs of the shift registers 126–132, respectively, by means of inverters 140–146. The four outputs from each of the stages of each of the shift registers 125–132 are connected through resistors which are not numbered, to a common output line 150.

In the operation of the circuitry illustrated in FIG. 2, a first 32 sample bits of the input signal are clocked into the shift registers 125–128. A predetermined time interval later a second 32 sample bits of the unknown signal are clocked into the shift registers 125–128 and the sample bits which were previously in the registers are clocked into the shift registers 129–132. After all of the sample bits are clocked into the shift registers 125–132 a comparison is made by way of the output line 150 and, if a correlation between the first set of sample bits and the second set of sample bits occurs, a correlation signal is applied by way of the line 150 to electronic circuitry, such as that previously described in conjunction with FIG. 1, which reduces the time interval before the next set of sample bits is taken. If a correlation between the first two sets of sample bits does not occur, the time interval remains constant. As in the description of FIG. 1, after predetermined number of correlations has occurred a detect signal is generated at an output of the circuitry.

Thus, an improved sampled signal detector is described which is capable of detecting a periodically recurring signal in a relatively short period of time without the necessity of monitoring the signal continuously. Further, the apparatus described is relatively simple to construct in integrated circuit form and noise falsing, shock falsing, and many other problems prelevant in prior art signal detectors are substantially reduced relative to these prior art signal detectors if the time for detecting therein is limited. It should be noted that the embodiment illustrated in FIG. 1 requires a reference which is at the same frequency, or periodically recurs the same, as the signal to be detected. However, the time interval between samples in not critical. In the embodiment illustrated in FIG. 2, the time interval between samples must be a whole integer multiple of the period of the signal to be detected but no reference signal is required. Other advantages of each of the embodiments will be readily appreciated by those skilled in the art. While I have shown and described two embodiments of the present invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A sampled signal detector for detecting a predetermined signal, comprising:
   a. signal storage means having first input means for receiving sample bits of data signals when an activation signal is applied to a second input thereof, said storage means having the capacity to store first and second pluralities of sample bits;
   b. correlation means connected to said signal storage means for comparing a first plurality of sample bits stored in said storage means to a second plurality of sample bits stored therein and providing an indication of correlation therebetween; and
   c. variable timing means connected to said storage means and providing activation signals thereto at predetermined time intervals, said timing means further being connected to said correlation means to receive the indications of correlation for varying the predetermined time interval upon the occurrence of a correlation in the correlation means, and said timing means including output means for providing a detection signal upon the occurrence of a predetermined number of successive correlations.

2. A sampled signal detector as claimed in claim 1 wherein the signal storage means includes first and second shift registers.

3. A sampled signal detector as claimed in claim 2 wherein the shift registers are clocked shift registers and each activation signal is a predetermined plurality of clock pulses.

4. A sampled signal detector for detecting a predetermined signal wherein the predetermined signal is a periodically recurring signal, comprising:
   a. signal storage means including first and second shift registers having first input means for receiving and storing first and second pluralities of sample bits of data signals, respectively, when an activation signal including a predetermined plurality of clock pulses is applied to second input means thereof;
   b. correlation means connected to said signal storage means for comparing a first plurality of sample bits stored in said first shift register to a second plurality of sample bits stored in said second shift register and providing an indication of correlation therebetween; and
   c. variable timing means connected to said storage means providing activation signals thereto at predetermined time intervals, said predetermined time interval between activation signals being a whole integer multiple of the period of said periodically recurring signal, said timing means further being connected to said correlation means to receive the indications of correlation for varying the predetermined time interval upon the occurrence of a correlation in the correlation means, and said timing means including output means for providing a detection signal upon the occurrence of a predetermined number of successive correlations.

5. A sampled signal detector as claimed in claim 4 wherein a plurality of the clock pulses in an activation signal occur within the period of the periodically recurring signal.

6. A sampled signal detector for detecting a predetermined signal, comprising:
   a. signal storage means including first and second shift registers having first and second portions and first input means for receiving and storing a first plurality of sample bits of a reference signal into the first register and a second plurality of sample bits of an unknown signal into the second register when an activation signal including a predetermined plurality of clock pulses is applied to second input means thereof;
   b. correlation means connected to said storage means for comparing sample bits stored in the first portion of the first shift register to sample bits stored in the first portion of the second shift register and sample bits stored in the second portion of the first shift register to sample bits stored in the second portion of the second shift register and providing an indication of correlation therebetween; and
   c. variable timing means connected to said storage means and providing activation signals thereto at predetermined time intervals, said timing means further being connected to said correlation means to receive the indications of correlation for varying the predetermined time interval upon the occurrence of a correlation in the correlation means, and said timing means including output means for providing a detection signal upon the occurrence of a predetermined number of successive correlations.

7. A sampled signal detector as claimed in claim 6 wherein each of the first and second portions of each of the first and second shift registers has a first gate connected to the input thereof for allowing the passage of data signals thereto only when a gating pulse is applied to the first gate and a second gate connected from the output to the input thereof for allowing the circulation of stored bits of signal only when a gating pulse is applied to the second gate, said first and second gates being coupled to the timing means for receiving alternate gating pulses thereon.

8. A sampled signal detector as claimed in claim 7 wherein the timing means includes circuitry for applying to the shift registers an activation signal having a first predetermined plurality of clock pulses during the application of the first gating pulse and an activation signal having a second predetermined plurality of clock pulses, higher than the first predetermined plurality, during the application of the second gating pulse.

9. A sampled signal detector as claimed in claim 8 wherein the timing means further includes circuitry for applying one additional clock pulse in each predetermined plurality of clock pulses to the second shift register during the time that a gating pulse is present on the second gates.

10. A sampled signal detector for detecting a predetermined signal, comprising:
  a. signal storage means having first input means for receiving sample bits of data signals when an activation signal is applied to a second input thereof, said storage means having the capacity to store first and second pluralities of sample bits;
  b. correlation means connected to said signal storage means for comparing a first plurality of sample bits stored in said storage means to a second plurality of sample bits stored therein and providing an indication of correlation therebetween; and
  c. variable timing means connected to said storage means and providing activation signals thereto at predetermined time intervals, said timing means further being connected to said correlation means to receive the indications of correlation for reducing the predetermined time interval upon the occurrence of a correlation in the correlation means, and said timing means including output means for providing a detection signal upon the occurrence of a predetermined number of successive correlations.

11. A sampled signal detector as claimed in claim 10 wherein the correlation means includes a counter and circuitry for supplying an input pulse to said counter for each error between the first and second pluralities of sample bits stored in the signal storage means, said counter producing an output signal when the count reaches a predetermined value, and means connecting the output signal from the counter to the timing means for resetting the timing means and maintaining the time of the predetermined time interval constant.

12. A sampled signal detector as claimed in claim 11 wherein the timing means periodically reduces the time in the time interval when no output signal is received from the correlation means.

13. A method of detecting a predetermined periodically recurring signal by sampling input data comprising the steps of:
  a. sampling the input data a first plurality of times and storing the sample bits;
  b. sampling the input data a second plurality of times a predetermined time interval after the first sampling;
  c. correlating the sample bits of the second sampling to the sample bits of the first sampling and providing an indication if correlation occurs;
  d. varying the predetermined time interval after receiving an indication of correlation; and
  e. counting the correlation indications and providing a detection signal when a predetermined number of successive correlation indications are counted.

14. A method as claimed in claim 13 wherein the indication of correlation is the lack of an output signal and the next predetermined time interval is automatically reduced after each predetermined time interval if an output signal is not received.

15. A method of detecting a predetermined periodically recurring signal comprising the steps of:
  a. correlating a portion of the signal with a portion of the signal received at a previous interval;
  b. varying the interval each time correlation occurs; and
  c. providing an output signal after the occurrence of a predetermined number of successive correlations.

16. A method of detecting a predetermined periodically recurring signal as claimed in claim 15 wherein the correlating step is performed by comparing both portions of the signal to a reference signal at the predetermined periodically recurring rate.

17. A method of detecting periodically recurring signal as claimed in claim 15, wherein the varying step includes the step of maintaining the interval constant each time a correlation does not occur.

18. A method as claimed in claim 13, wherein the varying step includes the step of maintaining the predetermined time interval constant each time an indication of correlation is not received.

* * * * *